(12) United States Patent
Säkkinen

(10) Patent No.: US 9,663,210 B2
(45) Date of Patent: May 30, 2017

(54) SHIP'S PROPULSION UNIT

(71) Applicant: ABB OY, Helsinki (FI)

(72) Inventor: Petri Säkkinen, Helsinki (FI)

(73) Assignee: ABB OY, Helsinki (FI)

( * ) Notice: Subject to any disclaimer, the term of this patent is extended or adjusted under 35 U.S.C. 154(b) by 290 days.

(21) Appl. No.: 14/325,903

(22) Filed: Jul. 8, 2014

(65) Prior Publication Data

US 2015/0015105 A1 Jan. 15, 2015

(30) Foreign Application Priority Data

Jul. 9, 2013 (EP) .................................... 13175690

(51) Int. Cl.
| | |
|---|---|
| *H02K 5/132* | (2006.01) |
| *B63B 1/32* | (2006.01) |
| *B63B 5/10* | (2006.01) |
| *B63H 25/00* | (2006.01) |
| *B63H 21/38* | (2006.01) |
| *B63J 2/12* | (2006.01) |
| *B63H 5/07* | (2006.01) |
| *B63H 5/125* | (2006.01) |
| *B63H 21/17* | (2006.01) |
| *B63H 1/02* | (2006.01) |

(Continued)

(52) U.S. Cl.
CPC ............. *B63H 21/383* (2013.01); *B63H 1/02* (2013.01); *B63H 5/07* (2013.01); *B63H 5/125* (2013.01); *B63H 21/17* (2013.01); *B63H 21/30* (2013.01); *B63H 21/36* (2013.01); *B63J 2/12* (2013.01); *H02K 5/132* (2013.01); *B63H 2005/1258* (2013.01)

(58) Field of Classification Search
CPC . H02K 5/132; B63B 1/32; B63H 5/10; B63H 25/00
USPC .......................... 310/87; 114/281; 440/67, 80
See application file for complete search history.

(56) References Cited

U.S. PATENT DOCUMENTS 3,791,331 A * 2/1974 Dilley .................... B63H 20/00
440/6
5,403,216 A 4/1995 Salmi et al.
(Continued)

FOREIGN PATENT DOCUMENTS

| DE | 196 27 323 A1 | 1/1998 |
|---|---|---|
| DE | 198 26 229 A1 | 2/1999 |

(Continued)

OTHER PUBLICATIONS

The extended European Search Report issued on Dec. 17, 2013, by the European Patent Office in European Patent Application No. 13175688.4-1753. (4 pages).

(Continued)

*Primary Examiner* — Jose Gonzalez Quinones
(74) *Attorney, Agent, or Firm* — Taft Stettinius & Hollister LLP

(57) ABSTRACT

The present disclosure relates to a ship's propulsion unit such as a ship's azimuthing propulsion unit. The propulsion unit can include at least one supporting metal sheet arranged between an support section of a shell structure of the propulsion unit and an cylindrical outer surface of a cylindrical section of a motor housing section of the shell structure for providing additional support for the motor housing section of the shell structure at the shell structure of the support section.

20 Claims, 8 Drawing Sheets

(51) Int. Cl.
*B63H 21/30* (2006.01)
*B63H 21/36* (2006.01)

(56) References Cited

U.S. PATENT DOCUMENTS

| | | | |
|---|---|---|---|
| 6,231,407 B1 | 5/2001 | Hein et al. | |
| 6,244,912 B1 * | 6/2001 | Quadrini | B63H 5/10 440/6 |
| 6,312,298 B1 | 11/2001 | Schuring | |
| 6,485,339 B1 * | 11/2002 | Hartig | B63H 5/125 310/87 |
| 6,837,757 B2 | 1/2005 | Eaves et al. | |
| 7,186,156 B2 | 3/2007 | Le Flem et al. | |
| 2003/0236036 A1 | 12/2003 | Varis | |
| 2004/0014380 A1 * | 1/2004 | Varis | B63H 5/125 440/76 |
| 2004/0053545 A1 | 3/2004 | Le Flem et al. | |
| 2004/0266277 A1 | 12/2004 | Ries | |
| 2005/0221692 A1 | 10/2005 | Varis | |
| 2008/0194155 A1 * | 8/2008 | Gaudin | B63H 5/14 440/67 |
| 2014/0072460 A1 | 3/2014 | Rohden | |

FOREIGN PATENT DOCUMENTS

| | | |
|---|---|---|
| DE | 297 24 214 U1 | 7/2000 |
| DE | 10 2011 005 588 A1 | 9/2012 |
| EP | 0 590 867 A1 | 4/1994 |
| EP | 1 010 614 A1 | 6/2000 |
| EP | 1 959 544 A2 | 8/2008 |
| JP | 02004059 U | 1/1990 |
| JP | 03094398 | 9/1991 |
| JP | 3963265 B2 | 5/2004 |
| JP | 2004142700 A | 5/2004 |
| JP | 2005186748 A | 7/2005 |
| JP | 4221493 B2 | 2/2009 |
| KR | 1020030046467 A | 6/2003 |
| KR | 100542427 B1 | 1/2006 |
| KR | 100933096 B1 | 12/2009 |
| WO | WO 01/54973 A1 | 8/2001 |
| WO | 03/015241 A1 | 2/2003 |
| WO | WO 2012/123547 A1 | 9/2012 |
| WO | 2013074017 A1 | 5/2013 |

OTHER PUBLICATIONS

The extended European Search Report issued on Dec. 2, 2013, by the European Patent Office in corresponding European Patent Application No. 13175690.0-1754. (5 pages).
The extended European Search Report issued on Mar. 3, 2014, by the European Patent Office in European Patent Application No. 13175692.6-1903. (11 pages).
Jun. 20, 2016 Korean Office Action for Application No. 10-2014-0084420; 8 pgs.
Intellectual Property Office of Singapore Written Opinion dated Jan. 23, 2017; Application No. 10201403081V; 4 pgs.
Intellectual Property Office of Singapore Search Report dated Jan. 23, 2017; Application No. 10201403081V; 2 pgs.
New Concepts for Electrically Driven Pod Systems; Joachim Muller, Sep. 2004; 14 pgs.

* cited by examiner

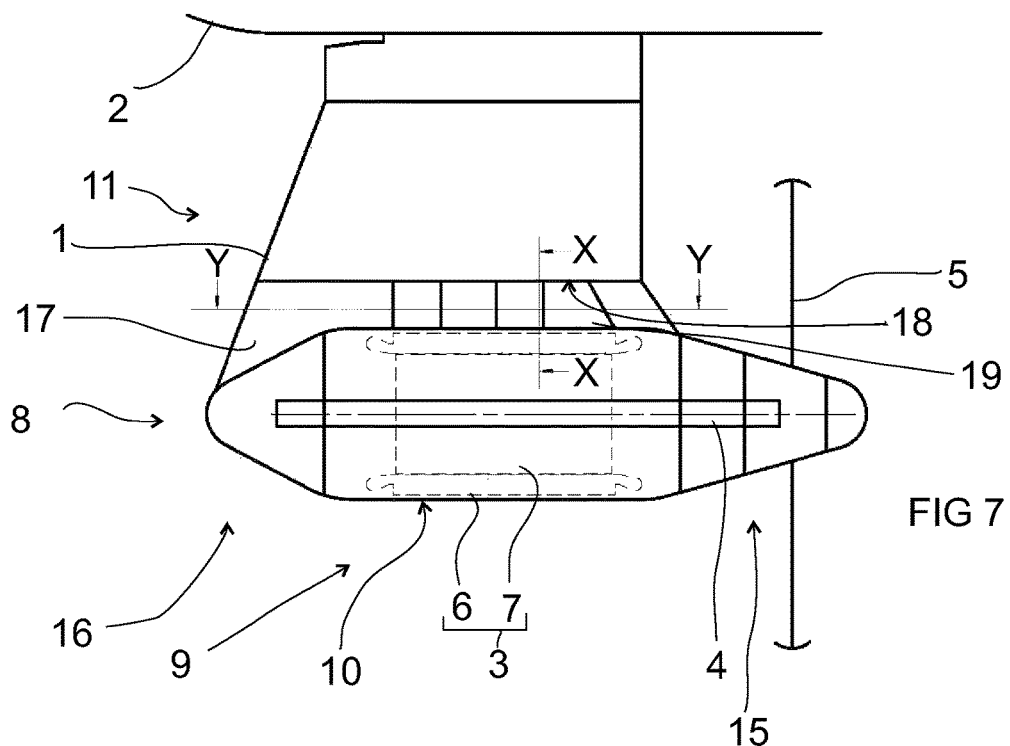
FIG 7
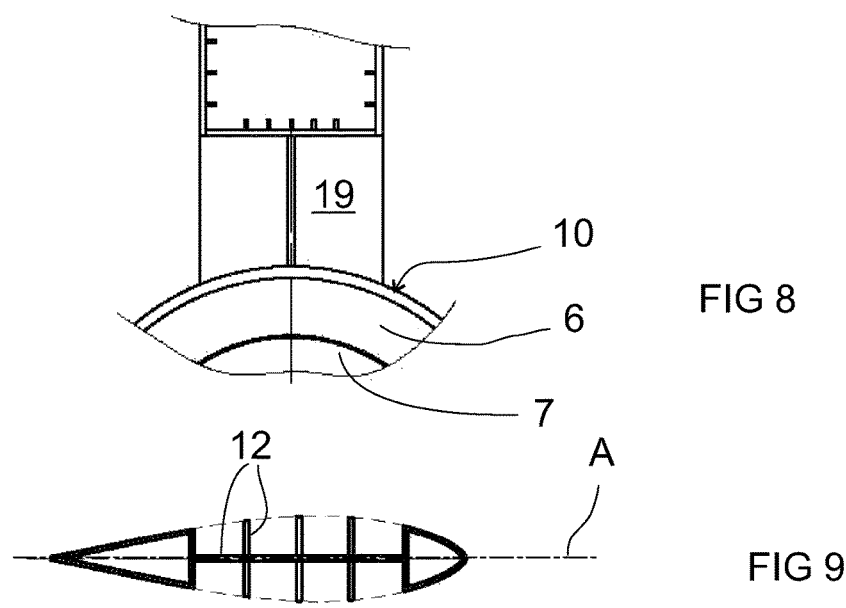
FIG 8
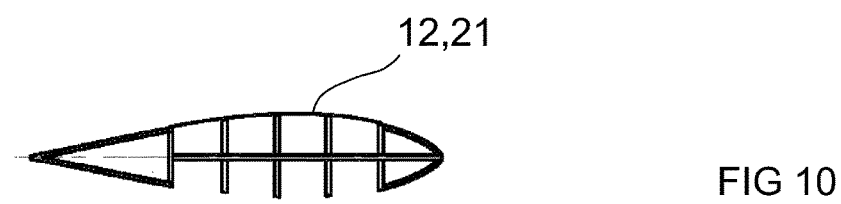
FIG 9
FIG 10

SHIP'S PROPULSION UNIT

FIELD OF THE INVENTION

The invention relates to a ship's propulsion unit such as a ship's azimuthing propulsion unit as defined in the preamble of independent claim 1.

A ship's propulsion unit is presented in document WO0154973.

OBJECTIVE OF THE INVENTION

The object of the invention is to provide a ship's propulsion unit that provides both for effective cooling of an electrical motor in a motor housing section of a shell structure of the propulsion unit to water surrounding the shell structure of the propulsion unit and for rigid support of the motor housing section of the shell structure at a support section of the shell structure.

SHORT DESCRIPTION OF THE INVENTION

The ship's propulsion unit of the invention is characterized by the definitions of independent claim 1.

Preferred embodiments of the ship's propulsion unit are defined in the dependent claims.

The ship's propulsion unit comprises a shell structure arranged below a hull of the ship and immersible at least partly in water so that the shell structure is at least partly surrounded by water. The ship's propulsion unit comprises an electric motor for rotating a propeller axis. The propeller axis extends to the outside of the shell structure. A propeller is mounted on the propeller axis outside the shell structure. The propulsion unit has a vertical longitudinal central plane. The electric motor has a stator and a rotor for rotating in the stator. The electric motor is arranged in a motor housing section of the shell structure so that the stator of the electric motor is form-fitted into a cylindrical section of the motor housing section of the shell structure. The cylindrical section has a cylindrical outer surface. The shell structure includes a support section having an lower end directly connected to the motor housing section of the shell structure and an upper end connected to the hull of the ship. The motor housing section of the shell structure has a first end from which the propeller axis extends to the outside of the shell structure and a second end at the opposite end of the motor housing section of the shell structure.

The invention is based on arranging at least one supporting metal sheet between the support section of the shell structure and a cylindrical outer surface of a cylindrical section of the motor housing section of the shell structure for providing additional support for the motor housing section 8 of the shell structure 1 at the shell structure 1 of the support section.

Because said at least one supporting metal sheet has a first side surface and a second side surface and because said at least one supporting metal sheet is fastened to the support section of the shell structure and fastened to the cylindrical outer surface of the cylindrical section of the motor housing section of the shell structure, water surrounding the shell structure is in contact with both the first side surface and the second side surface of said at least one supporting metal sheet. This supporting leaves most of the cylindrical outer surface of a cylindrical section of the motor housing section of the shell structure exposed to water surrounding the shell structure of the propulsion unit and provides therefore for effective cooling of the electrical motor in the motor housing section of the shell structure to water surrounding the shell structure of the propulsion unit.

LIST OF FIGURES

In the following the invention will described in more detail by referring to the figures, which FIG. 1 shows a ship's propulsion unit according to the prior art, FIG. 2 shows the ship's propulsion unit shown in FIG. 1 as cut along line X-X in FIG. 1, FIG. 3 shows the ship's propulsion unit shown in FIG. 1 as cut along line Y-Y in FIG. 1, FIG. 4 shows a first embodiment of the ship's propulsion unit, FIG. 5 shows the ship's propulsion unit shown in FIG. 4 as cut along line X-X in FIG. 4, FIG. 6 shows the ship's propulsion unit shown in FIG. 4 as cut along line Y-Y in FIG. 4, FIG. 7 shows a second embodiment of the ship's propulsion unit, FIG. 8 shows the ship's propulsion unit shown in FIG. 7 as cut along line X-X in FIG. 7, FIG. 9 shows the ship's propulsion unit shown in FIG. 7 as cut along line Y-Y in FIG. 7, FIG. 10 shows an alternative configuration of section Y-Y of the ship's propulsion unit shown in FIG. 7, FIG. 11 shows a third embodiment of the ship's propulsion unit, FIG. 12 shows the ship's propulsion unit shown in FIG. 11 as cut along line X-X in FIG. 11, FIG. 13 shows the ship's propulsion unit shown in FIG. 11 as cut along line Y-Y in FIG. 11, FIG. 14 shows a fourth embodiment of the ship's propulsion unit, FIG. 15 shows the ship's propulsion unit shown in FIG. 14 as cut along line Z-Z in FIG. 14, FIG. 16 shows the ship's propulsion unit shown in FIG. 14 as cut along line X-X in FIG. 14, FIG. 17 shows the ship's propulsion unit shown in FIG. 14 as cut along line Y-Y in FIG. 14, FIG. 18 shows a fifth embodiment of the ship's propulsion unit, FIG. 19 shows the ship's propulsion unit shown in FIG. 18 as cut along line X-X in FIG. 18, FIG. 20 shows the ship's propulsion unit shown in FIG. 18 as cut along line Y-Y in FIG. 18, FIG. 21 shows a sixth embodiment of the ship's propulsion unit, FIG. 22 shows the sixth embodiment shown in FIG. 21 in a state where the first detachable section and the second detachable section have been detached, FIG. 23 shows the first detachable section of the sixth embodiment shown in FIG. 21, and FIG. 24 shows the second detachable section of the sixth embodiment shown in FIG. 21.

DETAILED DESCRIPTION OF THE INVENTION

FIGS. 4 to 20 shows examples of embodiments of the ship's propulsion units (hereinafter "propulsion unit").

Figure 1:
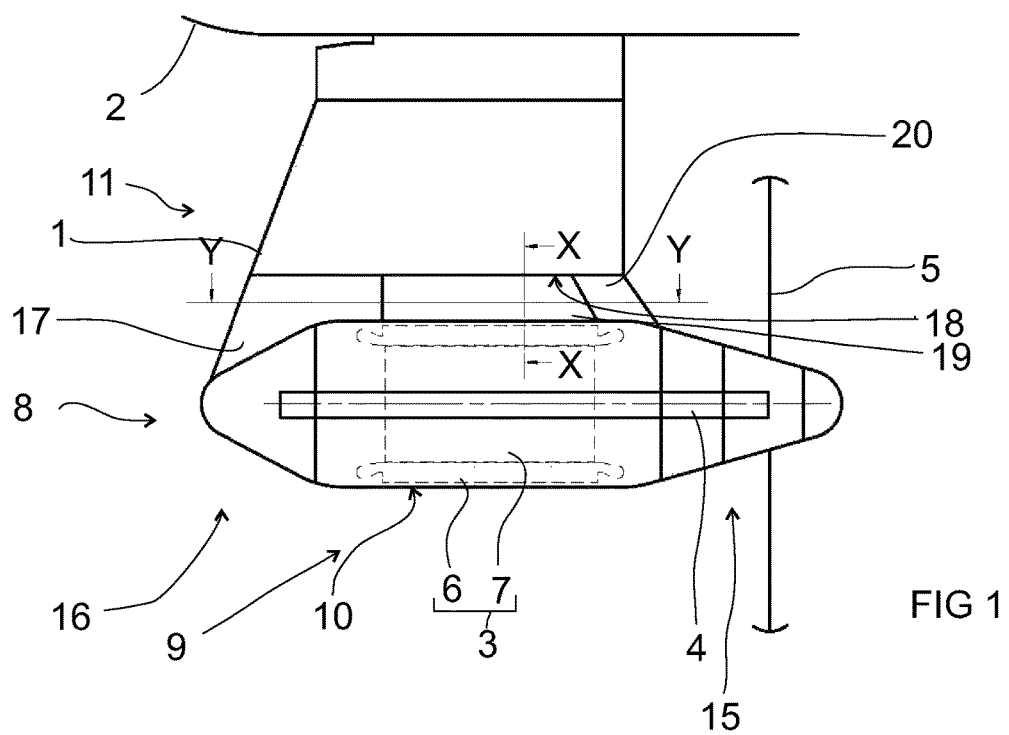
FIGS. 1 to 3 shows a ship's propulsion unit according to the prior art.
Figure 2:
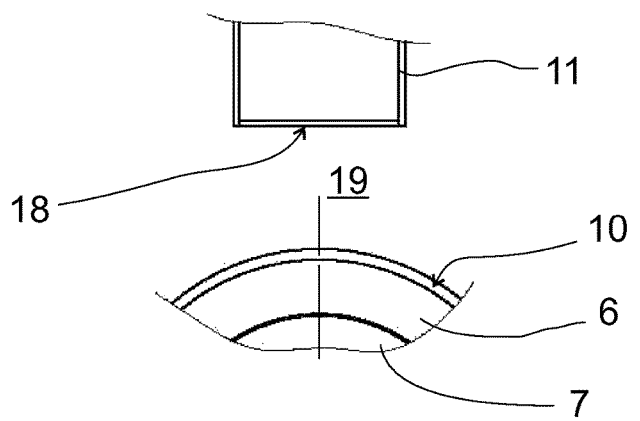
Figure 3:
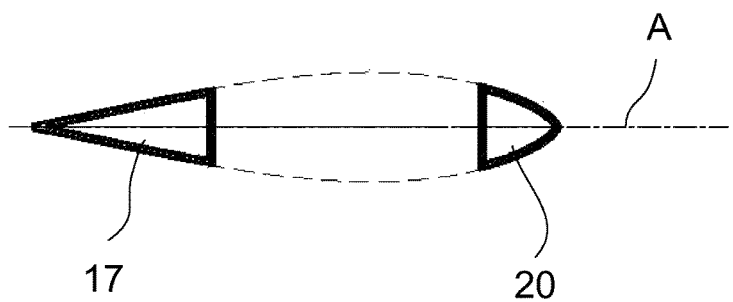
Figure 4:
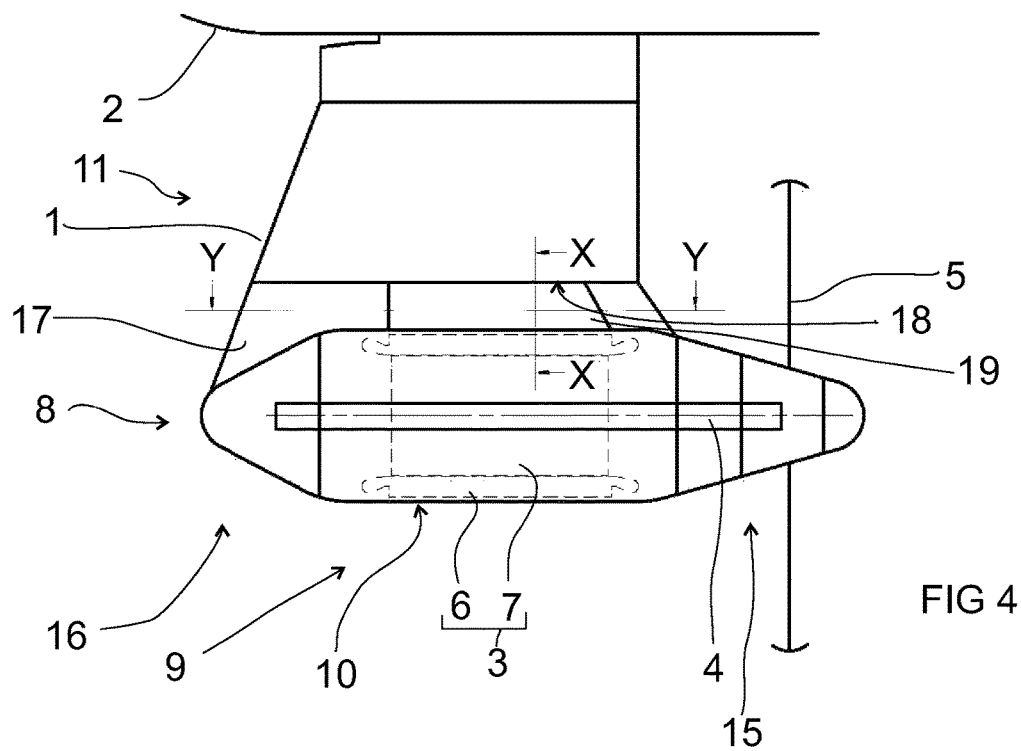
Figure 5:
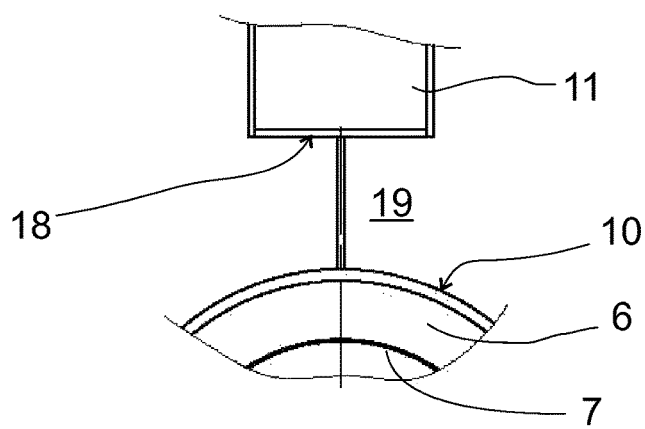
Figure 6:
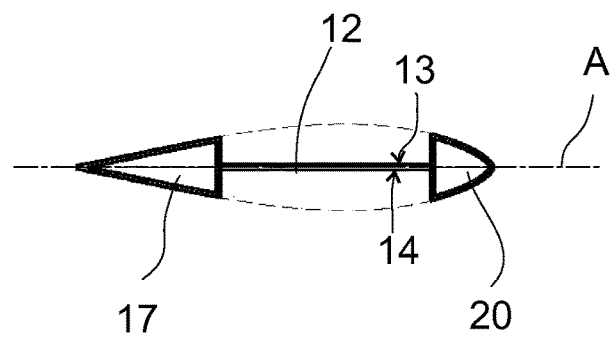

The ship's propulsion unit may be a ship's azimuthing propulsion unit that is attached to the hull 2 of the ship by means of a turning arrangement (not shown in the drawings) for turing the propulsion unit with respect to the hull 2 of the ship.

The propulsion unit comprises a shell structure 1 arranged below a hull 2 of the ship (not marked with a reference numeral) and immersible at least partly in water so that the shell structure 1 is at least partly surrounded by water The propulsion unit comprises an electric motor 3 for rotating a propeller axis 4. The propeller axis 4 extends to the outside of the shell structure 1. A propeller 5 is mounted on the propeller axis 4 outside the shell structure 1.

The propulsion unit has a vertical longitudinal central plane A.

The electric motor 3 has a stator 6 and a rotor 7 for rotating in the stator 6. The electric motor 3 is arranged in a motor housing section 8 of the shell structure 1 so that the stator 6 of the electric motor 3 is form-fitted into a cylindrical section 9 of the motor housing section 8 of the shell structure 1. The cylindrical section 9 has a cylindrical outer surface 10.

The shell structure 1 includes a support section 11 having an lower end (not marked with a reference numeral) directly connected to the motor housing section 8 of the shell structure 1 and an upper end (not marked with a reference numeral) connected to the hull 2 of the ship.

The propulsion unit comprises at least one supporting metal sheet 12 arranged between the support section 11 of the shell structure 1 and the cylindrical outer surface 10 of the cylindrical section 9 of the motor housing section 8 of the shell structure 1 for providing additional support for the motor housing section 8 of the shell structure 1 at the shell structure 1 of the support section 11.

Said at least one supporting metal sheet 12 has a first side surface 12 and a second side surface 14. Said at least one supporting metal sheet 12 is fastened to the support section 11 of the shell structure 1 and fastened to the cylindrical outer surface 10 of the cylindrical section 9 of the motor housing section 8 of the shell structure 1. Water surrounding the shell structure 1 is in contact with both the first side surface 12 and the second side surface 14 of said at least one supporting metal sheet 12.

Said at least one supporting metal sheet 12 has preferably, but not necessarily, a thickness between about 10 and about 40 mm, preferably between about 15 and about 25 mm, more preferably about 20 mm.

In the embodiments of the propulsion unit shown in FIGS. 4 to 20 the motor housing section 8 of the shell structure 1 has a first end 15 from which the propeller axis 4 extends to the outside of the shell structure 1 and a second end 16 at the opposite end of the motor housing section 8 of the shell structure 1. In the embodiments of the propulsion unit shown in FIGS. 4 to 20 the lower end of the support section 11 of the shell structure 1 is directly connected to the cylindrical outer surface 10 of the cylindrical section 9 of the motor housing section 8 of the shell structure 1 by means of a first connection section 17 of the support section 11 of the shell structure 1 at a region of the cylindrical outer surface 10 of the cylindrical section 9 of the motor housing section 8 of the shell structure 1 that is closer to the second end 16 of the motor housing section 8 of the shell structure 1 than to the first end 15 of the motor housing section 8 of the shell structure 1. In the embodiments of the propulsion unit shown in FIGS. 4 to 20 the support section 11 of the shell structure 1 having a lower surface 18 that is located at a distance from the cylindrical outer surface 10 of the cylindrical section 9 of the motor housing section 8 of the shell structure 1 and that faces the cylindrical outer surface 10 of the cylindrical section 9 of the motor housing section 8 of the shell structure 1 so that a space 19 is formed between the lower surface 18 of support section 11 of the shell structure 1 and the cylindrical outer surface 10 of the cylindrical section 9 of the motor housing section 8 of the shell structure 1. In the embodiments of the propulsion unit shown in FIGS. 4 to 20, the part of the cylindrical outer surface 10 of the cylindrical section 9 of the motor housing section 8 of the shell structure 1 that is located in the space 19 is in direct contact with water surrounding the shell structure 1.

The lower end of the support section 11 of the shell structure 1 may additionally to by means of a first connection section 17 be directly connected to cylindrical outer surface 10 of the cylindrical section 9 of the motor housing section 8 of the shell structure 1 by means of a second connection section 20 of the support section 11 of the shell structure 1 at a region of the motor housing section 8 of the shell structure 1 that is closer to the first end 15 of the motor housing section 8 of the shell structure 1 than to the second end 16 of the motor housing section 8 of the shell structure 1. In such embodiments said space 19 is formed between the first connection section 17 of the support section 11 of the shell structure 1 and the second connection section 20 of the support section 11 of the shell structure 1. Such embodiments of the propulsion unit are shown in FIGS. 4 to 13.

Figure 11:
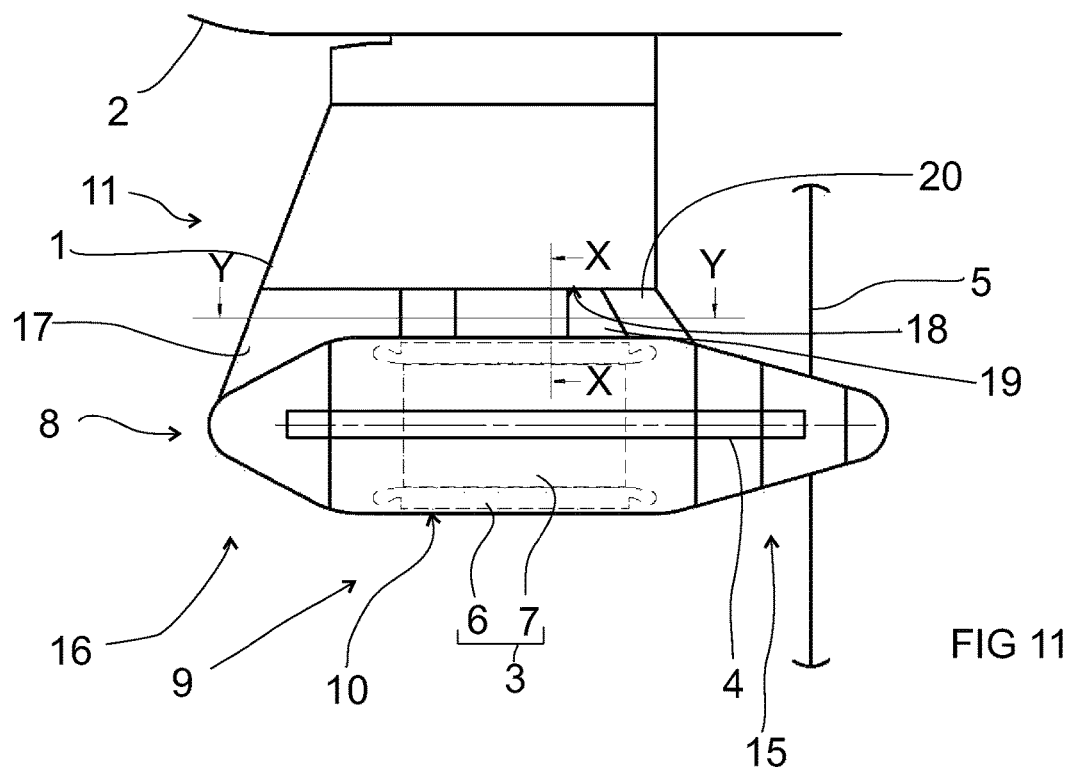
Figure 12:
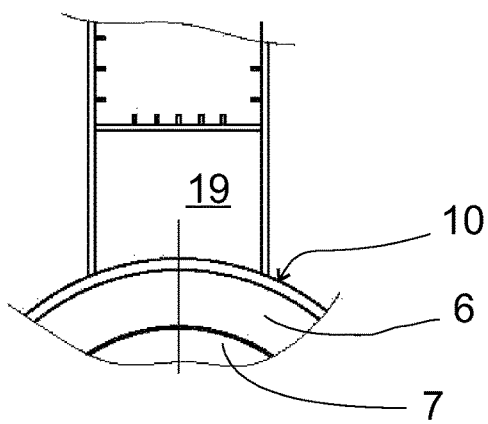
Figure 13:
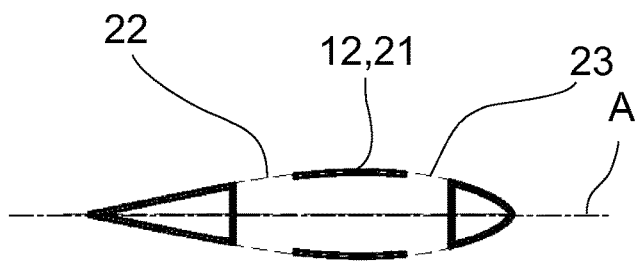
Figure 14:
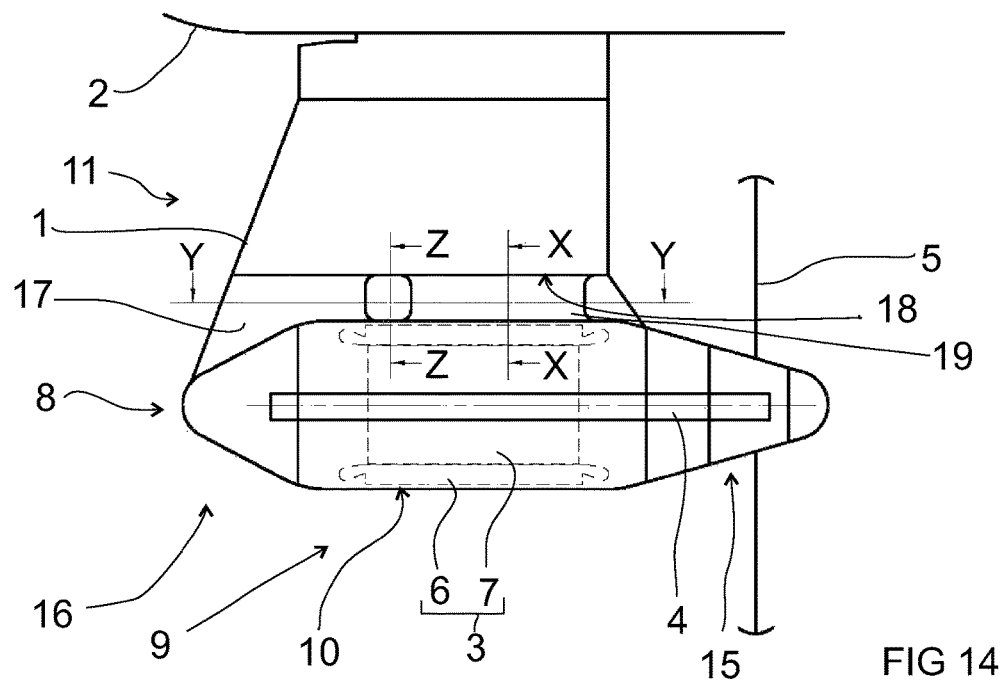
Figure 15:
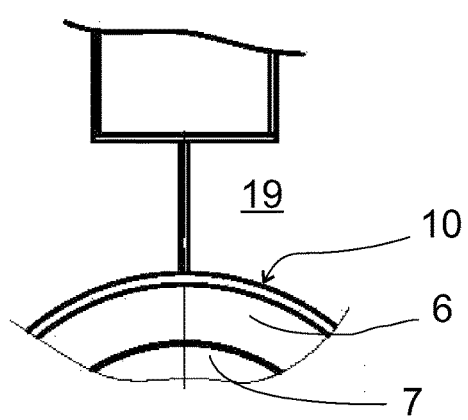
Figure 16:
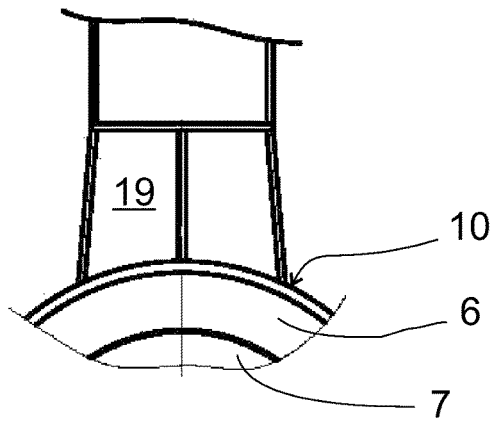
Figure 17:
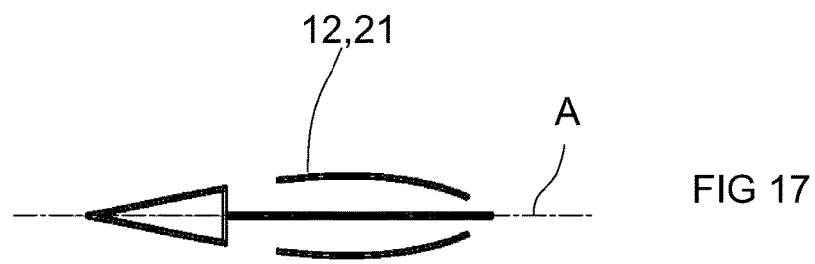

In the propulsion unit comprises a space 19 between the lower surface 18 of support section 11 of the shell structure 1 and the cylindrical outer surface 10 of the cylindrical section 9 of the motor housing section 8 of the shell structure 1, the propulsion unit may, as shown in the alternative configuration of the second embodiment shown in FIG. 10, in the third embodiment shown in FIGS. 11 to 13, and in the fourth embodiment shown in FIGS. 14 to 17, comprise at least one supporting metal sheet 12 forming a closing structure 21 arranged to partly close said space 19 so that water surrounding the shell structure 1 can enter the space 19 between and so that water can exit the space 19 between. Said at least one supporting metal sheet 12 forming a closing structure 21 arranged to partly close said space 19 may form a vertical extension of the support structure, which vertical extension extends between the support structure of the shell structure 1 and the cylindrical outer surface 10 of the cylindrical section 9 of the motor housing section 8 of the shell structure 1. Said at least one supporting metal sheet 12 may be arranged to partly close said space 19 so that a forward opening 22 forming an inlet and/or an outlet for water is formed and so that a rear opening 23 forming an outlet and/or an inlet for water is formed. Supporting metal sheet 12 forming closing structure 21s arranged to partly close said space 19 between may be arranged symmetrically at both sides of the space 19 with respect to the vertical longitudinal central plane A of the propulsion unit.

The propulsion unit may, as in the alternative configuration of the second embodiment shown in FIG. 10 and in the third embodiment shown in FIGS. 11 to 13, the propulsion unit comprise at least one supporting metal sheet 12 forming a closing structure 21 arranged to partly close a space 19 between the first connection section 17 and the second connection section 20 so that water surrounding the shell structure 1 can enter the space 19 between the first connection section 17 and the second connection section 20 and so that water can exit the space 19 between the first connection section 17 and the second connection section 20. In such embodiments said at least one supporting metal sheet 12 forming a closing structure 21 arranged to partly close said space 19 between the first connection section 17 and the second connection section 20 may form a vertical extension of the support structure, which vertical extension extends between the support structure of the shell structure 1 and the cylindrical outer surface 10 of the cylindrical section 9 of the motor housing section 8 of the shell structure 1. Said at least one supporting metal sheet 12 arranged to partly close said space 19 between the first connection section 17 and the second connection section 20 may be arranged so that a forward opening 22 forming an inlet and/or an outlet for water is formed between the first connection section 17 and said at least one supporting metal sheet 12, and so that a rear opening 23 forming an outlet and/or an inlet for water is formed between the second connection section 20 and said at least one additional support. Supporting metal sheet 12 forming closing structures 21 arranged to partly close said space 19 between the first connection section 17 and the second connection section 20 are preferably, but not necessarily, arranged symmetrically at both sides of the space 19 with respect to the vertical longitudinal central plane A of the propulsion unit.

Figure 18:
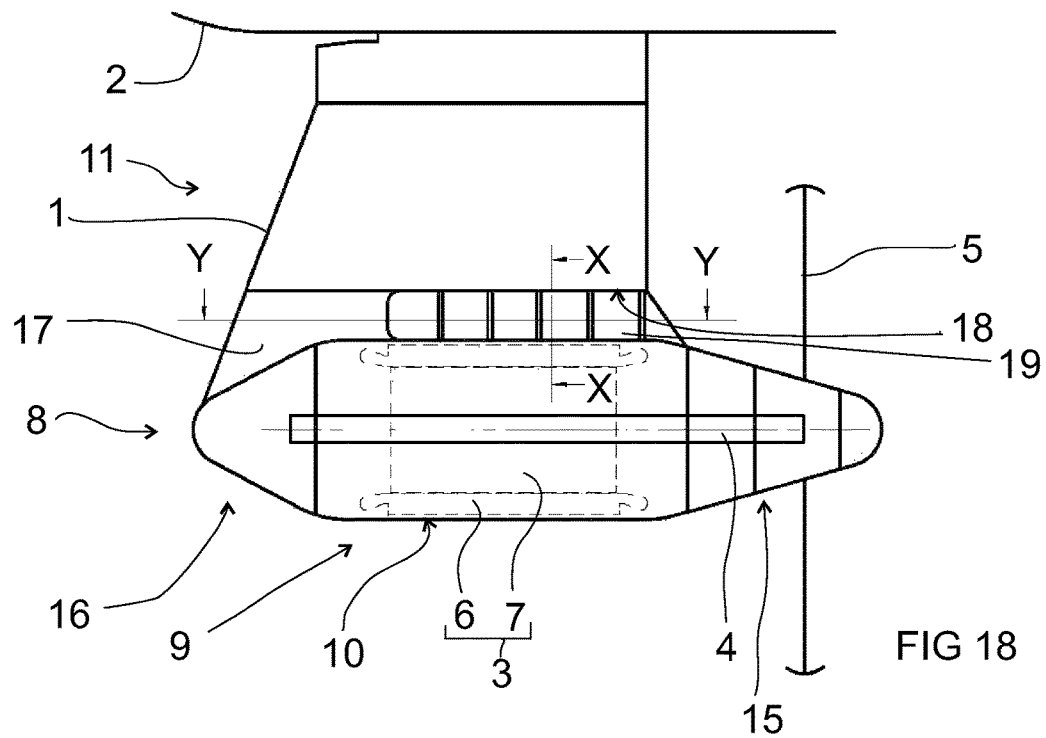
Figure 19:
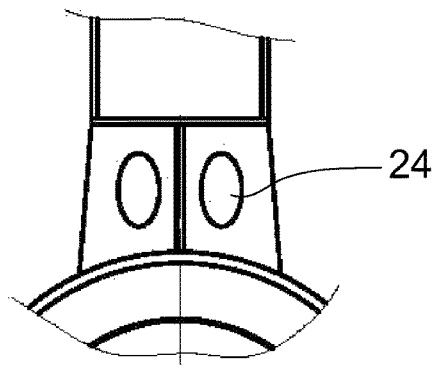
Figure 20:
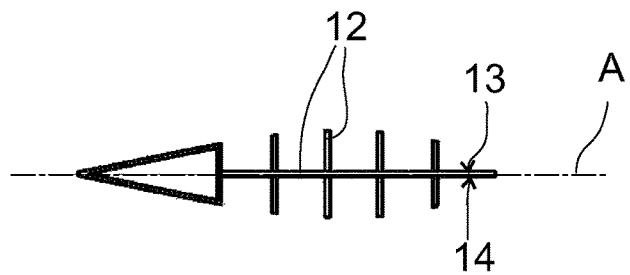
Figure 21:
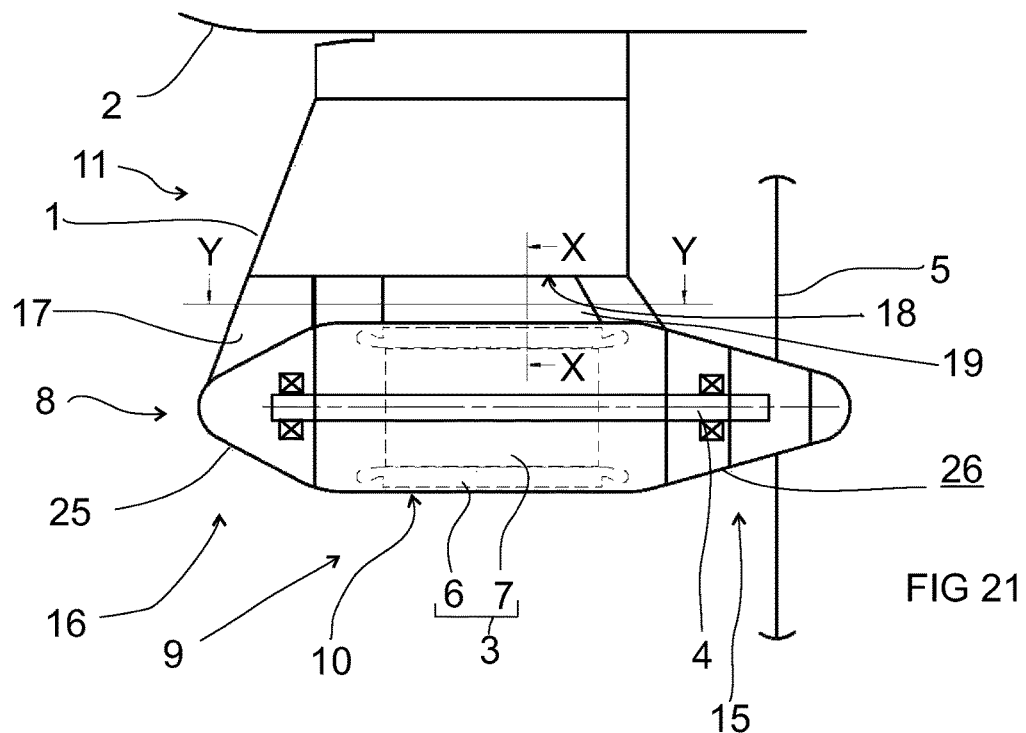
Figure 22:
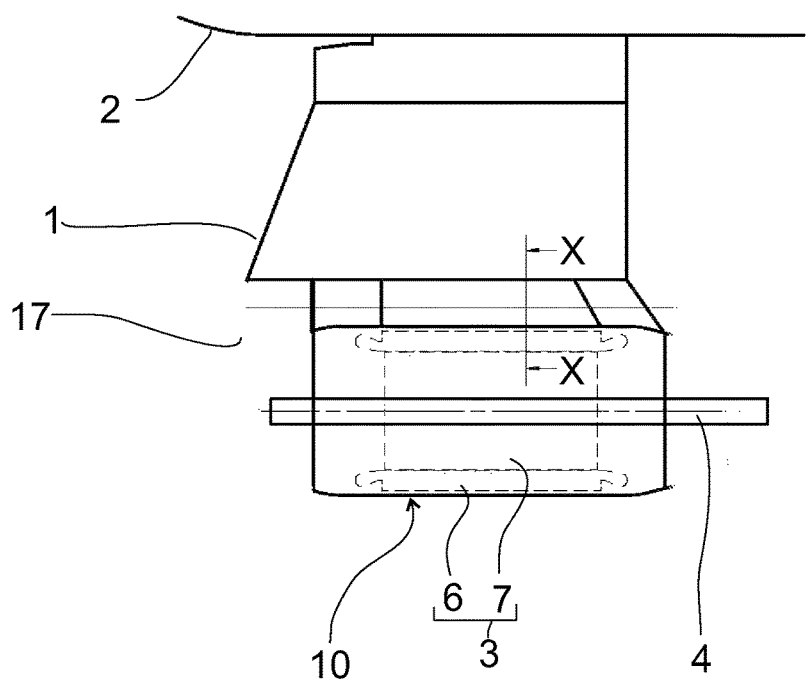
Figure 23:
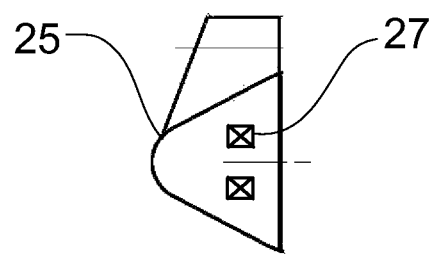
Figure 24:
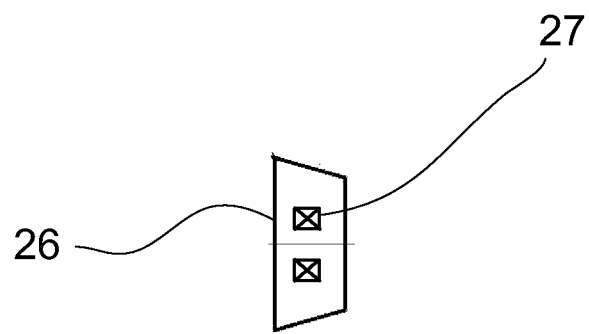

The supporting metal sheet 12 of the support section 11 of the shell structure 1 may, as in the fifth embodiment shown in FIGS. 18 to 20, comprise at least one opening 24 for allowing water surrounding the shells structure to flow through supporting metal sheet 12 of the support section 11 of the shell structure 1.

The propulsion unit comprises preferably, but not necessarily, a plurality of supporting metal sheets 12 each being arranged being fastened to the support section 11 of the shell structure 1 and fastened to the cylindrical outer surface 10 of the cylindrical section 9 of the motor housing section 8 of the shell structure 1. Some of said plurality of supporting metal sheets 12 may extend vertically at the vertical longitudinal central plane A of the propulsion unit. Some supporting metal sheets 12 of said plurality of supporting metal sheets 12 may extend vertically at the vertical longitudinal central plane A of the propulsion unit, and some supporting metal sheets 12 of said plurality of supporting metal sheets 12 may extend vertically and transversely with respect to the vertical longitudinal central plane A of the propulsion unit. Said plurality of supporting metal sheets 12 may be arranged symmetrically with respect to the vertical longitudinal central plane A of the propulsion unit.

In the propulsion unit the electric motor 3 may be a permanent-magnet electric motor.

In the propulsion unit the cylindrical section 9 of the motor housing section 8 of the shell structure 1 is preferably, but not necessarily, of a single-layer form.

In the propulsion unit said at least one supporting metal sheet 12 is preferably, but not necessarily, of a single-layer form. In the propulsion unit all supporting metal sheets 12 are preferably, but not necessarily, of a single-layer form.

In the propulsion unit the motor housing section 8 includes preferably, but not necessarily, as shown in FIGS. 21 to 24, a first detachable section 25 at the first end 15 of the motor housing section 8 of the shell structure 1. Such first detachable section 25 of the motor housing section 8 houses a bearing arrangement 27 for the propeller axis 4. Such first detachable section 25 of the motor housing section 8 is unattached to the support section 11 of the shell structure 1. A purpose of such first detachable section 25 is to facilitate service or replacing of the bearing arrangement 27 without having to detach the whole propulsion unit arrangement from the hull 2 of the ship or without having to detach the motor housing section 8 from the support section 11. Because of said at least one supporting metal sheet 12 between the support section 11 of the shell structure 1 and the cylindrical outer surface 10 of the motor housing section 8 of the shell structure 1, the motor housing section 8 stays attached in a secure manner at the support section 11 when such first detachable section 25 is detached.

In the propulsion unit the motor housing section 8 includes preferably, but not necessarily, as shown in FIGS. 21 to 24, a second detachable section 26 at the second end 16 of the motor housing section 8 of the shell structure 1. Such second detachable section 26 of the motor housing section 8 houses a bearing arrangement 27 for the propeller axis 4. Such second detachable section 26 of the motor housing section 8 is unattached to the support section 11 of the shell structure 1. A purpose of such second detachable section 26 is to facilitate service or replacing of the bearing arrangement 27 without having to detach the whole propulsion unit arrangement from the hull 2 of the ship or without having to detach the motor housing section 8 from the support section 11. Because of said at least one supporting metal sheet 12 between the support section 11 of the shell structure 1 and the cylindrical outer surface 10 of the motor housing section 8 of the shell structure 1, the motor housing section 8 stays attached in a secure manner at the support section 11 when such second detachable section 26 is detached.

In the propulsion unit the lower end of the support section 11 is preferably, but not necessarily, directly connected to the motor housing section 8 of the shell structure 1 so that the cylindrical outer surface 10 of the cylindrical section 9 of the motor housing section 8 of the shell structure 1 partly forms the outermost surface of the propulsion unit.

It is apparent to a person skilled in the art that as technology advanced, the basic idea of the invention can be implemented in various ways. The invention and its embodiments are therefore not restricted to the above examples, but they may vary within the scope of the claims.

LIST OF REFERENCE NUMERALS

1. Shell structure
2. Hull
3. Electric motor
4. Propeller axis
5. Propeller
6. Stator
7. Rotor
8. Motor housing section
9. Cylindrical section
10. Cylindrical outer surface
11. Support section
12. Supporting metal sheet
13. First side surface
14. Second side surface
15. First end
16. Second end
17. First connection section
18. Lower surface
19. Space
20. Second connection section
21. Closing structure
22. Forward opening
23. Rear opening
24. Opening
25. First detachable section
26. Second detachable section
27. Bearing arrangement

The invention claimed is:

1. A ship's propulsion unit, comprising:
a shell structure configured to be arranged below a hull of the ship and immersible at least partly in water so that the shell structure is at least partly surrounded by water; and
an electric motor for rotating a propeller axis, wherein the propeller axis extends to the outside of the shell structure;
a propeller mounted on the propeller axis outside the shell structure;
wherein the propulsion unit has a vertical longitudinal central plane A;
wherein the electric motor has a stator and a rotor for rotating in the stator;
wherein the electric motor is arranged in a motor housing section of the shell structure so that the stator of the electric motor is form-fitted into a cylindrical section of the motor housing section of the shell structure,
wherein the cylindrical section has a cylindrical outer surface;
wherein the shell structure includes a support section having an lower end directly connected to the motor housing section of the shell structure and an upper end for connection to a hull of a ship, and
wherein the motor housing section of the shell structure has a first end from which the propeller axis extends to the outside of the shell structure and a second end at an opposite end of the motor housing section of the shell structure, wherein
at least one supporting metal sheet is arranged between the support section of the shell structure and the cylindrical outer surface of the cylindrical section of the motor housing section of the shell structure for providing additional support for the motor housing section of the shell structure at the shell structure of the support section;
said at least one supporting metal sheet having a first side surface and a second side surface; and
said at least one supporting metal sheet being fastened to the support section of the shell structure and fastened to the cylindrical outer surface of the cylindrical section of the motor housing section of the shell structure, such that when water surrounds the shell structure it will contact both the first side surface and the second side surface of said at least one supporting metal sheet.

2. The propulsion unit according to claim 1, wherein the lower end of the support section of the shell structure is directly connected to the cylindrical outer surface of the cylindrical section of the motor housing section of the shell structure by means of a first connection section of the support section of the shell structure at a region of the cylindrical outer surface of the cylindrical section of the motor housing section of the shell structure that is closer to the second end of the motor housing section of the shell structure than to the first end of the motor housing section of the shell structure;
the support section of the shell structure having a lower surface that is located at a distance from the cylindrical outer surface of the cylindrical section of the motor housing section of the shell structure and that faces the cylindrical outer surface of the cylindrical section of the motor housing section of the shell structure so that a space is formed between the lower surface of support section of the shell structure and the cylindrical outer surface of the cylindrical section of the motor housing section of the shell structure; and
the part of the cylindrical outer surface of the cylindrical section of the motor housing section of the shell structure that is located in the space will be in direct contact with water surrounding the shell structure.

3. The propulsion unit according to claim 2, wherein the lower end of the support section of the shell structure is additionally directly connected to cylindrical outer surface of the cylindrical section of the motor housing section of the shell structure by means of a second connection section of the support section of the shell structure at a region of the motor housing section of the shell structure that is closer to the first end of the motor housing section of the shell structure than to the second end of the motor housing section of the shell structure; and
said space being formed between the first connection section of the support section of the shell structure and the second connection section of the support section of the shell structure.

4. The propulsion unit according to claim 2, wherein at least one supporting metal sheet forming a closing structure is arranged to partly close said space so that water surrounding the shell structure can enter the space between and so that water can exit the space between.

5. The propulsion unit according to claim 4, wherein said at least one supporting metal sheet forming a closing structure arranged to partly close said space will form a vertical extension of the support structure, which vertical extension extends between the support structure of the shell structure and the cylindrical outer surface of the cylindrical section of the motor housing section of the shell structure.

6. The propulsion unit according to claim 4, wherein said at least one supporting metal sheet is arranged to partly close said space so that a forward opening forming an inlet and/or an outlet for water is formed and so that a rear opening forming an outlet and/or an inlet for water is formed.

7. The propulsion unit according to claim 4, wherein, the supporting metal sheet forming a closing structure is arranged to partly close said space, being arranged symmetrically at both sides of the space with respect to a vertical longitudinal central plane of the propulsion unit.

8. The propulsion unit according to claim 1, wherein, a plurality of supporting metal sheets are each fastened to the support section of the shell structure and to the cylindrical outer surface of the cylindrical section of the motor housing section of the shell structure.

9. The propulsion unit according to claim 8, wherein some of said plurality of supporting metal sheets extend vertically along a vertical longitudinal central plane of the propulsion unit.

10. The propulsion unit according to claim 8, wherein
some supporting metal sheets of said plurality of supporting metal sheets extend vertically along the vertical longitudinal central plane of the propulsion unit; and
some supporting metal sheets of said plurality of supporting metal sheets extend vertically and transversely with respect to the vertical longitudinal central plane of the propulsion unit.

11. The propulsion unit according to claim 8, wherein
said plurality of supporting metal sheet are arranged symmetrically with respect to the vertical longitudinal central plane of the propulsion unit.

12. The propulsion unit according to claim 1, wherein the electric motor is a permanent-magnet electric motor.

13. The propulsion unit according to claim 1, wherein the cylindrical section of the motor housing section of the shell structure is of a single-layer form.

14. The propulsion unit according to claim 1, wherein said at least one supporting metal sheet is a single-layer form.

15. The propulsion unit according to claim 1, wherein the motor housing section includes a first detachable section (25) at the first end of the motor housing section of the shell structure;

the first detachable section (25) of the motor housing section houses a bearing arrangement (27) for the propeller axis; and the first detachable section (25) of the motor housing section is unattached to the support section of the shell structure.

16. The propulsion unit according to claim 1, wherein the motor housing section includes a second detachable section (26) at the second end of the motor housing section of the shell structure, the second detachable section (26) of the motor housing section houses a bearing arrangement (27) for the propeller axis; and the second detachable section (26) of the motor housing section is unattached to the support section of the shell structure.

17. The propulsion unit according to claim 1, wherein the lower end of the support section is directly connected to the motor housing section of the shell structure so that the cylindrical outer surface of the cylindrical section of the motor housing section of the shell structure partly forms an outermost surface of the propulsion unit.

18. The propulsion unit according to claim 3, wherein at least one supporting metal sheet forming a closing structure is arranged to partly close said space so that water surrounding the shell structure can enter the space between and so that water can exit the space between.

19. The propulsion unit according to claim 18, wherein a plurality of supporting metal sheets are each fastened to the support section of the shell structure and to the cylindrical outer surface of the cylindrical section of the motor housing section of the shell structure.

20. The propulsion unit according to claim 19, wherein some supporting metal sheets of said plurality of supporting metal sheets extend vertically along the vertical longitudinal central plane of the propulsion unit; and some supporting metal sheets of said plurality of supporting metal sheets extend vertically and transversely with respect to the vertical longitudinal central plane of the propulsion unit.

* * * * *